(12) United States Patent
Hsieh et al.

(10) Patent No.: US 7,646,512 B2
(45) Date of Patent: Jan. 12, 2010

(54) IMAGE PROCESSING APPARATUS AND METHOD OF THE SAME

(75) Inventors: Tung-Lin Hsieh, Tao Yuan Shien (TW); Yu-Wen Huang, Tao Yuan Shien (TW); Hsin-Hung Lee, Tao Yuan Shien (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 559 days.

(21) Appl. No.: 11/595,662

(22) Filed: Nov. 10, 2006

(65) Prior Publication Data

US 2007/0223041 A1    Sep. 27, 2007

(30) Foreign Application Priority Data

Mar. 22, 2006   (TW) .............................. 95109751 A

(51) Int. Cl.
*H04N 1/40*    (2006.01)
(52) U.S. Cl. .................. 358/3.01; 358/1.9; 382/274; 345/690

(58) Field of Classification Search .................. 358/1.9, 358/3.01, 3.21, 521; 382/274; 345/617, 345/690, 89
See application file for complete search history.

(56) References Cited

U.S. PATENT DOCUMENTS

| 6,879,731 B2 * | 4/2005 | Kang et al. ................. 382/274 |
| 7,414,608 B2 * | 8/2008 | Funamoto et al. ........... 345/102 |
| 2005/0057486 A1 * | 3/2005 | Aoki et al. .................. 345/102 |

* cited by examiner

*Primary Examiner*—Thomas D Lee
(74) *Attorney, Agent, or Firm*—Stites & Harbison, PLLC; Juan Carlos A. Marquez, Esq

(57) ABSTRACT

The invention discloses an image processing apparatus and method thereof capable of preserving a great deal of light and dark details, so as to improve the contrast of each image. Furthermore, when calculating the value of gray level, the gray levels may be divided into equal parts, each of which includes four gray levels. Accordingly, the range of gray level is changed from 0~255 to 0~63, such that the hardware resources can be saved.

18 Claims, 5 Drawing Sheets

IMAGE PROCESSING APPARATUS AND METHOD OF THE SAME

BACKGROUND OF THE INVENTION

1. Field of the Invention

The invention relates to an image processing apparatus and method of the same, for increasing the contrast of an input image in a display system.

2. Description of the Prior Art

Contrast stretching typically means to extend the range of gray scale level to the maximum gray scale level 0~255 of a monitor, so as to increase the dynamic range of the distribution of the gray scale level of image and to further enhance the contrast of the image.

Please refer to FIG. 1, which illustrates a histogram of image characters. Conventional image contrast stretching technology first analyzes the distribution of the gray scale level of an inputted image, and then it generates a histogram of image characters of the inputted image as shown in FIG. 1. Then, the maximum gray scale level (Max) and the minimum gray scale level (Min) of the histogram is defined respectively. Take Photoshop as an example; the maximum gray scale level is defined to be the gray scale level corresponding to the 0.5% of the area from the right of the histogram, and the minimum gray scale level is defined to be the gray scale level corresponding to the 0.5% of area from the left of the histogram. For a color image, the maximum gray scale level means the maximum gray level among the red, green, and blue color (RGB), whereas the minimum gray scale level means the minimum gray level among the red, green, and blue color (RGB). Furthermore, the image contrast stretching is calculated via the following equation:

$$\text{Gray}' = k*(\text{Gray}-\text{Min}) \qquad \text{Equ. 1}$$

Wherein $k=255/(\text{Max}-\text{Min})$, Gray represents the gray scale level of the inputted image, and Gray' represents the gray scale level after image contrast stretching.

According to the diagram of image characters, when the maximum and the minimum gray scale level are applied in the image contrast stretching, part of the larger and smaller gray scale levels (as shown by arrow a and b in FIG. 1) will be ignored, and details of dark and light zones will disappear. In the prior art, dynamic Gamma contrast enhancement technology is applied to enhance the details of dark and light zones. However, because the method hereinbefore is a dynamic process, it needs many Gamma look-up tables and further exhausts a large amount of hardware resources.

Accordingly, the major aspect of the present invention is to provide an image processing apparatus and method of the same to overcome the problems as described above.

SUMMARY OF THE INVENTION

An aspect of the present invention is to provide an image processing apparatus and method of the same. Furthermore, the image processing apparatus is capable of retaining a large number of details of dark and light zones and then strengthening the contrast of various images. Moreover, the present invention is capable of saving hardware resources.

According to a preferred embodiment, in a display system, an inputted video sequence comprises N image frames, each of which consists T pixels, and each pixel of each image frame comprises M color components and M gray scale levels, each of which corresponds to one of the M color components; N, T, and M are natural numbers. Furthermore, in the embodiment, the M color components are R, G, and B (Red, Green, and Blue) color components respectively conforming to RGB color space.

Additionally, the preferred embodiment provides an apparatus that functions to adjust the M gray scale levels of the M color components of the jth pixel of the ith image frame in the video sequence, wherein i is an integer index ranging from 1 to N, and j is an integer index ranging from 1 to T. The gray scale levels of the image frames previous to the ith image frame have already been adjusted, and each of the image frames previous to the ith image frame has a maximum gray scale level and a minimum gray scale level. Each maximum gray scale level or each minimum gray scale level is determined by the gray scale level of the corresponding image frame and is within an allowable range. Generally, the gray scale level is in between 0 and 225; that is to say, the allowable range is between 0 and 255.

The apparatus includes a first calculating module, a second calculating module, a third calculating module, a fourth calculating module, a first judging module, a second judging module, a first processing module, and a second processing module. The first calculating module is applied for calculating, according to the gray scale levels of the ith image frame, a current maximum gray scale level and a current minimum gray scale level. The second calculating module is applied for calculating, according to all the maximum gray scale levels of the image frames previous to the ith image frame and the current maximum gray scale level, an average maximum gray scale level, and it also calculates, according to all the minimum gray scale levels of the image frames previous to the ith image frame and the current minimum gray scale level, an average minimum gray scale level. Furthermore, the third calculating module is applied for calculating, according to the average maximum gray scale level, a first gain, and for calculating, according to the average minimum gray scale level, a second gain.

The first judging module is applied for judging whether the jth pixel of the ith image frame is black. When the jth pixel of the ith image frame is black, the fourth calculating module adjusts, according to the second gain, the gray scale level of each color component of the jth pixel. Furthermore, when the jth pixel of the ith image frame is not black, the second judging module further judges whether the ith image frame is dark or light. When the jth pixel is not black, and the ith image frame is dark, the first processing module selectively adjusts, according to the first gain, the gray scale level of each color component of the jth pixel. Moreover, when the jth pixel is not black and the ith image frame is light, the second processing module selectively adjusts, according to the second gain, the gray scale level of each color component of the jth pixel.

In the embodiment as described above, when calculating the maximum gray scale level and the minimum gray scale level, every four gray scale level can be defined as a division; for example, the gray scale level 0 to 3 can be a division, and gray scale level 4 to 7 can be another division. By this way, the range of the gray scale level can be changed from 0~255 to 0~63, and the hardware resources can be saved.

Accordingly, the image processing apparatus of the invention is capable of retaining a large number of details of dark and light zones and then strengthening the contrast of various images. Moreover, the present invention is capable of saving hardware resources.

The scope of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The present invention provides an apparatus and method for adjusting the contrast of an inputted vides sequence in a display system. It should be noted that no matter what kind of color space the inputted image sequence belongs to, the image processing apparatus and method of the same can process the inputted image sequence.

According to the first preferred embodiment of the invention, a video sequence is inputted to a display system. The inputted video sequence comprises N image frames, each of which consists T pixels, and each pixel of each image frame comprises M color components and M gray scale levels, each of which corresponds to one of the M color components; N, T, and M are natural number. Furthermore, in the embodiment, the M color components are R, G, and B (Red, Green, and Blue) color components respectively conforming to RGB color space.

Additionally, the apparatus of the invention is capable of adjusting the M gray scale levels of the M color components of the jth pixel of the ith image frame in the video sequence; i is an integer index ranging from 1 to N, and j is an integer index ranging from 1 to T. The gray scale levels of each image frame previous to the ith image frame have been adjusted, and each of the image frames previous to the ith image frame has a maximum gray scale level and a minimum gray scale level. Each maximum gray scale level or each minimum gray scale level is determined by the gray scale level of the corresponding image frame and is within an allowable range. Generally, the gray scale level is in between 0 to 225; that is to say, the allowable range is between 0 and 255. Furthermore, in the embodiment, every four gray scale level can be defined as a division while the maximum and the minimum gray scale levels are calculated. Accordingly, the range of the gray scale level can be changed from 0~255 to 0~63, and the hardware resources can be saved.

Figure 1:
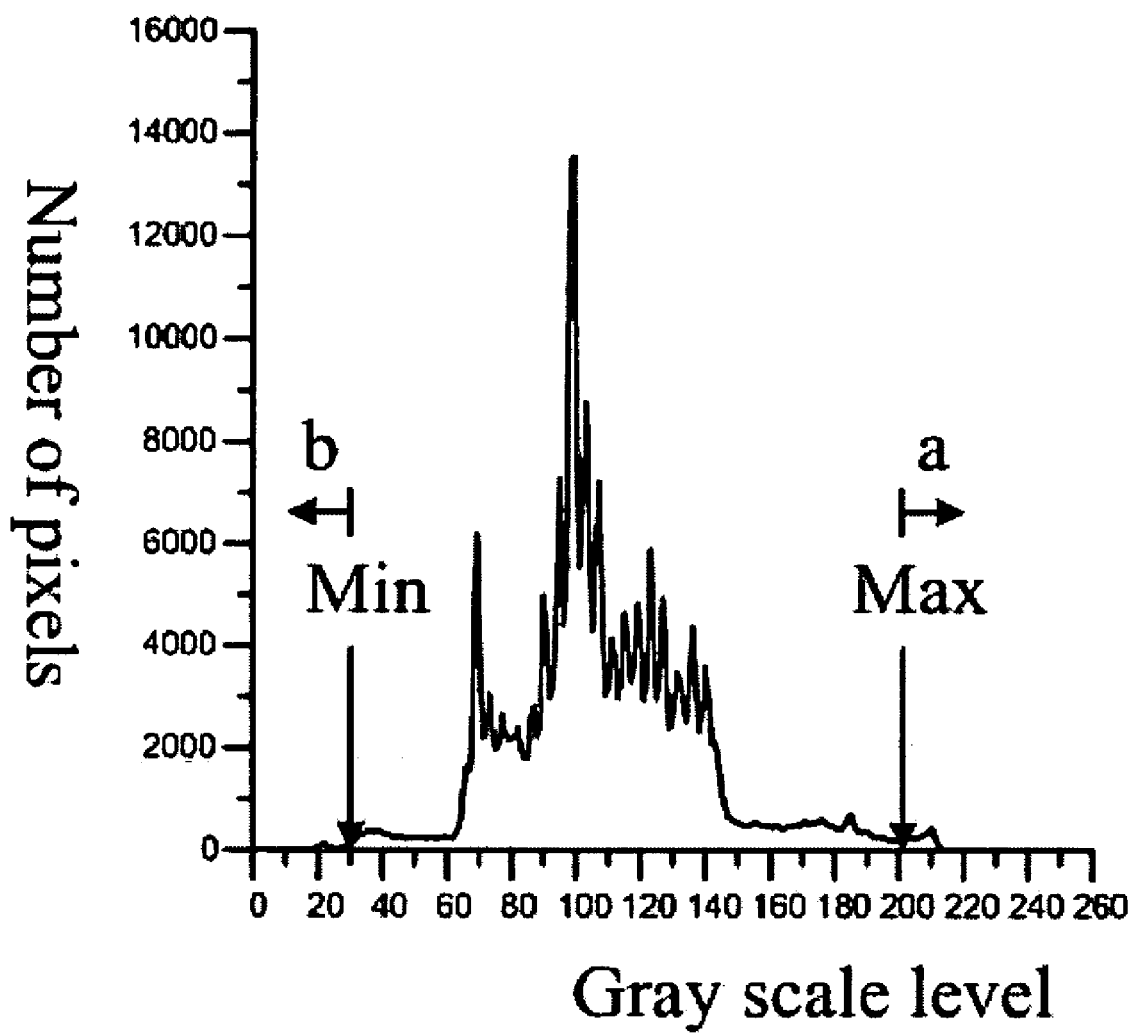
FIG. 1 shows a histogram of image characters.
Figure 2:
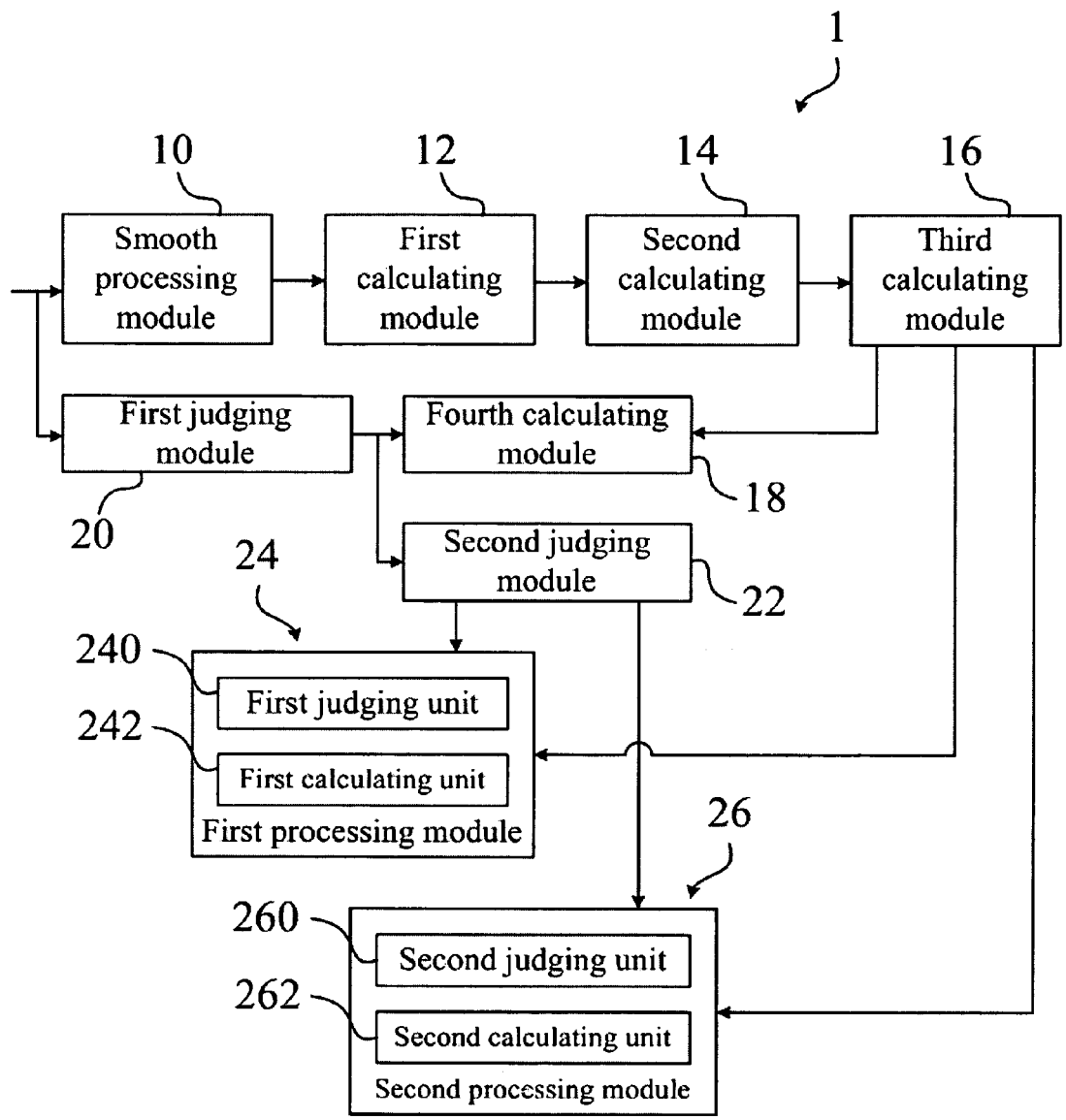
FIG. 2 shows a functional block diagram of the image processing apparatus of the first preferred embodiment of the invention.

Referring to FIG. 2, which shows a functional block diagram of the image processing apparatus 1 of the first preferred embodiment of the invention. The apparatus includes a smooth processing module 10, a first calculating module 12, a second calculating module 14, a third calculating module 16, a fourth calculating module 18, a first judging module 20, a second judging module 22, a first processing module 24, and a second processing module 26. Additionally, the first processing module 24 further includes a first judging unit 240 and a first calculating unit 242, whereas the second processing module 26 further includes a second judging unit 260 and a second calculating unit 262.

Figure 3:
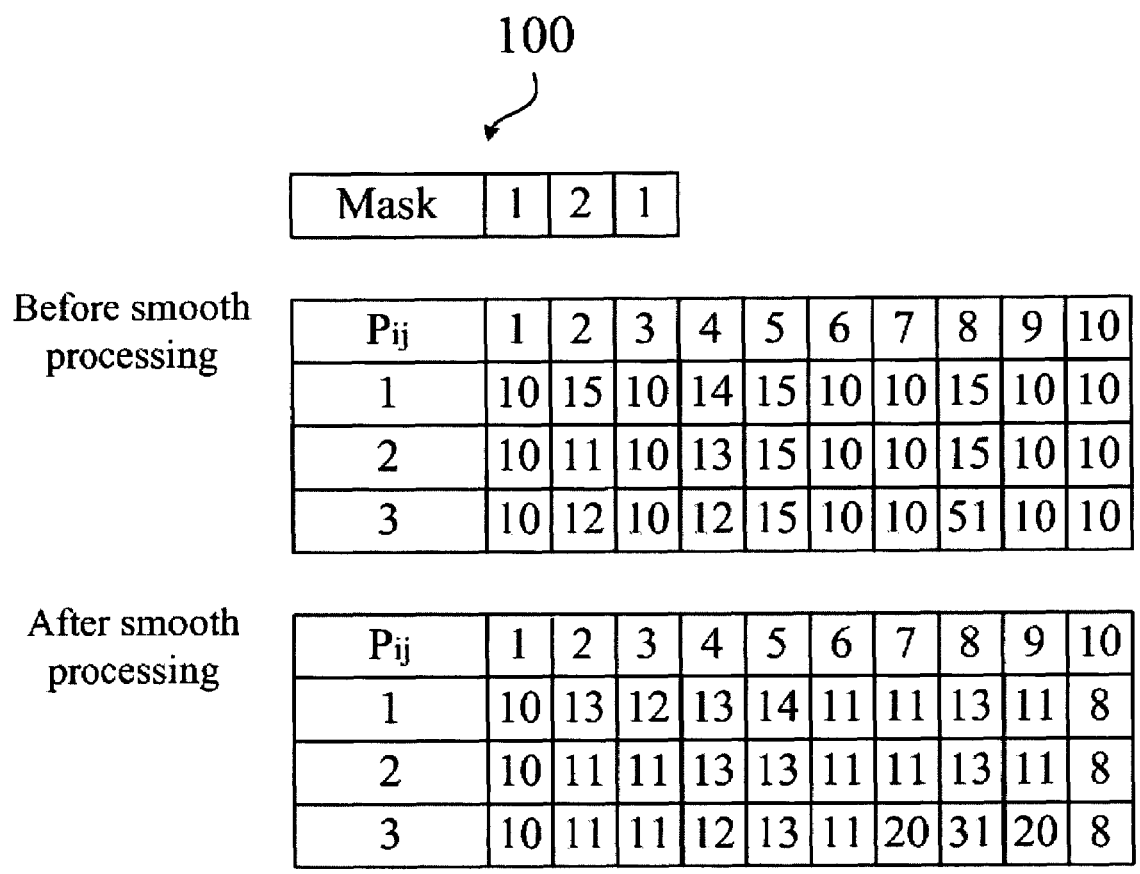
FIG. 3 is a schematic diagram of the smoothing process of every pixel of the image frame by a mask.

Please refer to FIG. 3, which is a diagram of the smoothing process of every pixel of the image frame by a mask 100. In the first preferred embodiment as described above, the smooth processing module 10 uses a mask 100 to smooth each pixel of each image frame. As shown in FIG. 3, the mask 100 uses [1 2 1]/4 to smooth each pixel of each image frame. For example, before the smoothing process, $P_{21}$ is equal to 15, and after the smoothing process, $P_{21}=(10*1+15*2+10*1)/4=13$, $P_{21}$ is changed from 15 to 13. Afterward, the action is repeated as described above to process $P_{31}$, and so on. In another embodiment, the mask also can use [1 2 2 2 1]/8 to smooth each pixel of each image frame. The objective of the smoothing process is to avoid obtaining noises, while generating the histogram of image characters, and increasing the error of image.

After the smoothing process, the first calculating module 12 will calculate a current maximum gray scale level and a current minimum gray scale level, according to the gray scale levels of the ith image frame. After that, the second calculating module 14 is applied for calculating, according to all the maximum gray scale levels of the image frames previous to the ith image frame and the current maximum gray scale level, an average maximum gray scale level Avg_max, and it also calculates, according to all the minimum gray scale levels of the image frames previous to the ith image frame and the current minimum gray scale level, an average minimum gray scale level Avg_min. For instance, the maximum and the minimum gray scale level of the 31st image frame is 245 and 60, respectively. If four gray scale levels are defined as a division, the current maximum gray scale level of the 31st image frame is 245/4=61, and the current minimum gray scale level of the 31st image frame is 60/4=15. Assume that the average of the maximum gray scale levels of the 1st image frame to the 30th image frame is 61, and the average of the minimum gray scale levels is 15, the average maximum gray scale level (Avg_max) calculated by the second calculating module 14 is 61, and the average minimum gray scale level (Avg_min) is 15. It should be noted that the calculation of the maximum gray scale level and the minimum gray scale level is the same as in the prior art, and discussion of unnecessary details will be omitted.

Afterward, the third calculating module 16 calculates a first gain, according to the average maximum gray scale level, and calculates a second gain, according to the average minimum gray scale level. The first gain g1 is calculated via the following equation:

$$g1 = n*R\_max - Avg\_max \qquad \text{Equ. 2,}$$

wherein n represents a gain parameter, and in the embodiment, n is equal to 2; R_max represents a maximum level of the range of gray scale level, so it is equal to 255/4=63. Therefore, g1=2*63−61=65.

Moreover, the second gain g2 is calculated via the following equation:

$$g2 = R\_max - Avg\_min \qquad \text{Equ. 3.}$$

Therefore, g2=63−15=48.

Subsequently, the first judging module 20 judges whether the jth pixel of the ith image frame is black. When the maximum gray scale value of each color component of the jth pixel is smaller than a third threshold, the first judging module 20 judges the jth pixel of the ith image frame is black; on the contrary, the first judging module 20 judges the jth pixel of the ith image frame is not black. For example, the third threshold is given to be 8. If the gray scale level of each color component of the jth pixel is (R, G, B)=(3, 5, 7), wherein the maximum gray scale level is 7, the first judging module 20 judges the jth pixel is black. On the contrary, if the gray scale level of each color component of the jth pixel is (R, G, B)=(100, 3, 5), wherein the maximum gray scale level is 100, the first judging module 20 judges the jth pixel is not black.

Additionally, when the jth pixel is black, the fourth calculating module 18 adjusts the gray scale level of each color component of the jth pixel, according to the second gain g2. For example, if the gray scale level of each color component of the jth pixel is (R, G, B)=(3, 5, 7), the fourth calculating module 18 adjusts the gray scale to be (R, G, B)=(3*0.761, 5*0.761, 7*0.761)=(2, 4, 5), wherein 0.761 is obtained by g2 divided by R_max. That is to say, the jth pixel will be blacker than before.

Moreover, when the jth pixel is not black, the second judging module 22 further judges whether the ith image frame is dark or light. When a pre-defined percentage of the maximum gray scale values of every pixel of the ith image frame is smaller than the current maximum gray scale level, the second judging module 22 judges the ith image frame is dark; on the contrary, the second judging module 22 judges the ith image frames is light. For instance, if 99.3% of the maximum gray scale values of every pixel is smaller than the current maximum gray scale level, the second judging module 22 judges the ith image frame is dark.

In addition, when the jth pixel is not black, and the ith image frame is dark, the first judging unit 240 of the first processing module 24 judges whether the minimum gray scale level of each color component of the jth pixel is smaller than a first threshold. Furthermore, if the minimum gray scale level of the color component of the jth pixel is smaller than the first threshold, the first calculating unit 242 adjusts the gray scale level of each color component of the jth pixel, according to the first gain g1; on the contrary, the first calculating unit 242 calculates the gray scale level of each color component of the jth pixel via the following equation:

$$[(1/4 - 1/32)*(S - 704)*(1020 - 11*g1) + 704*g1]/64, \quad \text{Equ. 4}$$

wherein S represents the gray scale level of each color component of the jth pixel, and the calculation is proceeded by means of 10 bit.

For example, the first threshold is defined to be 176. When the gray scale level of every color component of the jth pixel is (R, G, B)=(100, 3, 5), wherein the minimum gray scale level is 3; the first calculating unit 242 adjusts the gray scale level to be (R, G, B)=(100*1.03, 3*1.03, 5*1.03)=(103, 3, 5), wherein 1.03 is obtained by the first gain g1 divided by R_max. Furthermore, when the gray scale level of every color component of the jth pixel is (R, G, B)=(200, 220, 190), wherein the minimum gray scale level is 190, the first calculating unit 242 adjusts the gray scale level via Equ. 4 to be (R, G, B)=(203, 224, 192). If the range of the gray scale level is indicated as 0~255, the gray scale level before the adjustment is (R, G, B)=(800, 880, 760)$_{10bit}$, and the gray scale level after the adjustment is (R, G, B)=(812, 896, 768)$_{10bit}$.

Additionally, when the jth pixel is not black, and the ith image frame is light, the second judging unit 260 of the second processing module 26 judges whether the minimum gray scale level of each color component of the jth pixel is smaller than a second threshold. Moreover, when the minimum gray scale level of each color component of the jth pixel is smaller than the second threshold, the second calculating unit 262 adjusts the gray scale level of each color component of the jth pixel, according to the second gain g2; on the contrary, the second calculating unit 262 calculates the gray scale level of each color component of the jth pixel via the following equation:

$$[(1/4 - 1/128)*(S - 800)*(1224 - 15*g2) + 800*g2]/64, \quad \text{Equ. 5}$$

wherein S represents the gray scale level of each color component of the jth pixel, and the calculation is proceeded by means of 10 bit.

For example, the second threshold is defined to be 200. When the gray scale level of every color component of the jth pixel is (R, G, B)=(100, 3, 5), wherein the minimum gray scale level is 3, the second calculating unit 262 adjusts the gray scale level to be (R, G, B)=(100*0.761, 3*0.761, 5*0.761)=(76, 2, 4). Furthermore, when the gray scale level of every color component of the jth pixel is (R, G, B)=(250, 220, 210), wherein the minimum gray scale level is 210, the second calculating unit 262 adjusts the gray scale level via Equ. 5 to be (R, G, B)=(174, 160, 155). If the range of the gray scale level is indicated as 0~255, the gray scale level before the adjustment is (R, G, B)=(1000, 880, 840)$_{10bit}$, and the gray scale level after the adjustment is (R, G, B)=(695, 638, 616)$_{10bit}$.

According to the embodiments hereinbefore, the image processing apparatus 1 is capable of retaining a large number of details of dark and light zones and then strengthening the contrast of various images. Furthermore, every four gray scale level can be defined as a division while the gray scale level is calculated. Accordingly, the range of the gray scale level can be changed from 0~255 to 0~63, and the hardware resources can be saved.

Figure 4:
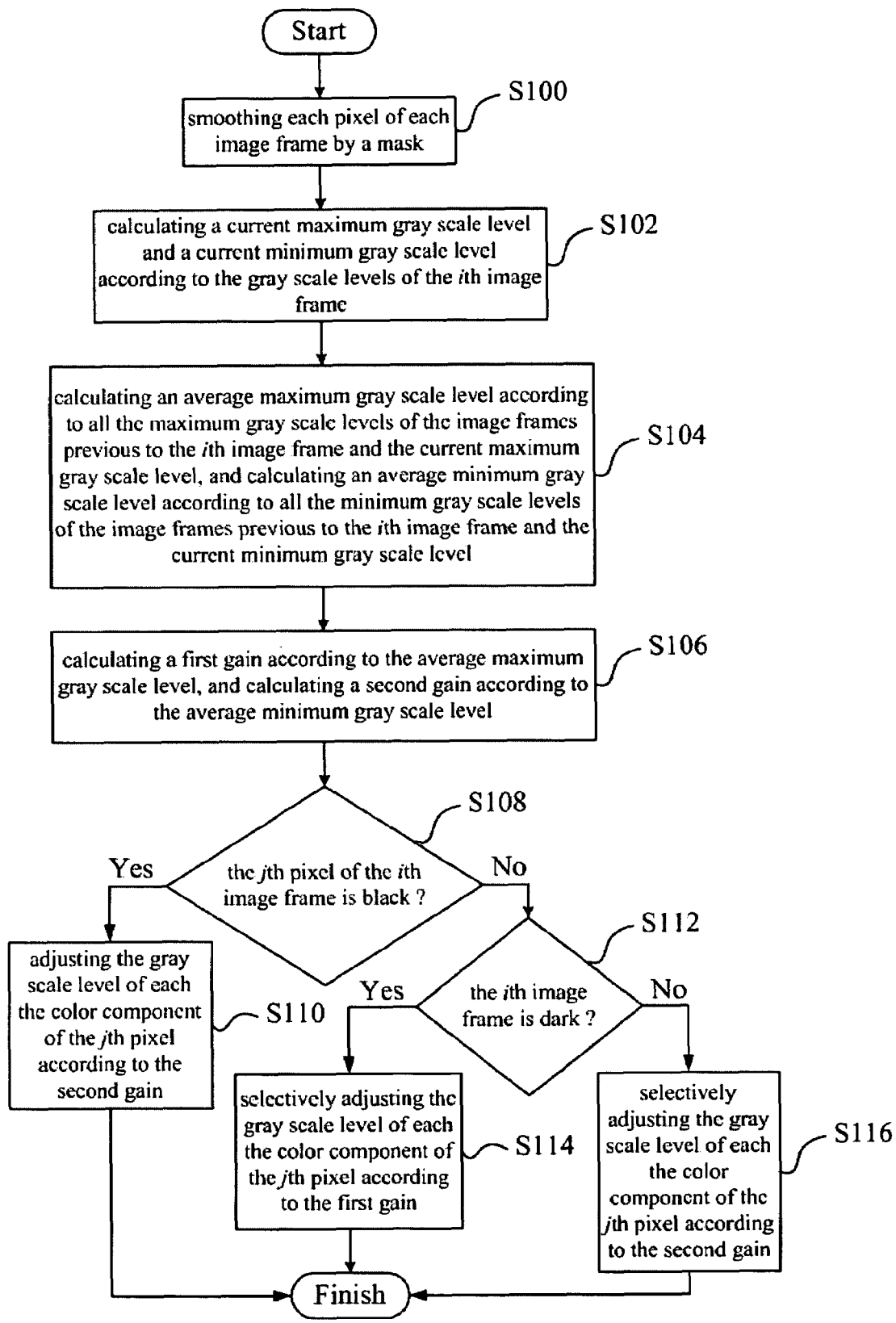
FIG. 4 shows a flowchart of the image processing method of the first preferred embodiment of the invention.

Referring to FIG. 4, which is a flowchart of the image processing method of the first preferred embodiment of the invention; in view of FIG. 2 and FIG. 3, the image processing method of the invention is applied to adjust the gray scale level of the jth pixel of the ith image frame of the video sequence inputted in the display system. According to the first preferred embodiment of the invention as described above, the image processing method includes the following steps:

Step S100: using a mask to smooth each pixel of each image frame;

Step S102: calculating a current maximum gray scale level and a current minimum gray scale level in accordance with the gray scale levels of the ith image frame;

Step S104: calculating an average maximum gray scale level, in accordance with all the maximum gray scale levels of the image frames previous to the ith image frame and the current maximum gray scale level, and calculating an average minimum gray scale level, in accordance with all the minimum gray scale levels of the image frames previous to the ith image frame and the current minimum gray scale level;

Step S106: calculating a first gain according to the average maximum gray scale level, and calculating a second gain according to the average minimum gray scale level;

Step S108: judging whether the jth pixel of the ith image frame is black, if yes, proceeding to step S110; otherwise, proceeding to step S112;

Step S110: adjusting the gray scale level of each color component of the jth pixel, in accordance with the second gain;

Step S112: judging whether the ith image frame is dark or light, and if the ith image frame is dark, processing step S114, and if the ith image frame is light, processing step S116;

Step S114: selectively adjusting the gray scale level of each color component of the jth pixel, in accordance with the first gain;

Step S116: selectively adjusting the gray scale level of each color component of the jth pixel, in accordance with the second gain.

Figure 5:
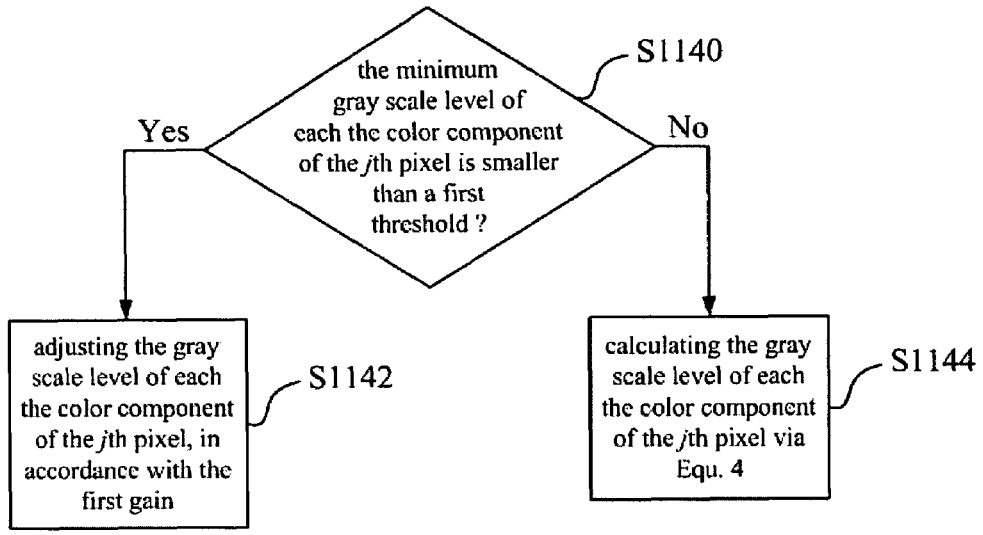
FIG. 5 is a flowchart illustrating step S114 shown in FIG. 4 in detail.

Referring to FIG. 5, which is a flowchart illustrating step S114 shown in FIG. 4 in detail, step S114 further includes the following steps:

Step S1140: judging whether the minimum gray scale level of each color component of the jth pixel is smaller than a first threshold, and if yes, processing step S1142, and if not, processing step S1144;

Step S1142: adjusting the gray scale level of each color component of the jth pixel, in accordance with the first gain;

Step S1144: calculating the gray scale level of each color component of the jth pixel via Equ. 4 as described above.

Figure 6:
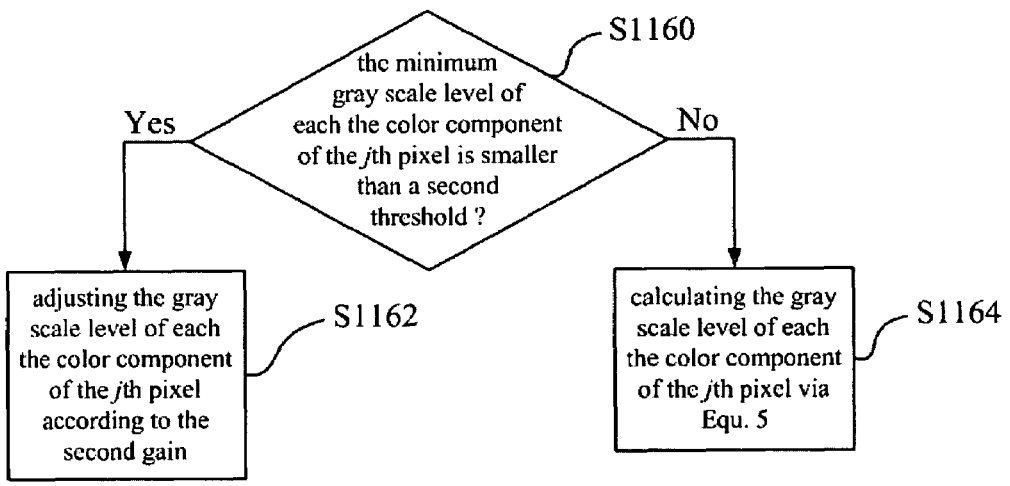
FIG. 6 is a flowchart illustrating step S116 shown in FIG. 4 in detail.

Referring to FIG. 6, which is a flowchart illustrating step S116 shown in FIG. 4 in detail, step S116 further includes the following steps:

Step S1160: judging whether the minimum gray scale level of each color component of the jth pixel is smaller than a second threshold, and if yes, processing step S1162, and if not, processing step S1164;

Step S1162: adjusting the gray scale level of each color component of the jth pixel, in accordance with the second gain;

Step S1164: calculating the gray scale level of each color component of the jth pixel via Equ. 5 as described above.

Compared with the prior art, the image processing apparatus and method of the present invention can retain a large number of details of dark and light zones, thus strengthening the contrast of various images. Furthermore, every four gray scale level can be defined as a division while the gray scale level is calculated. Accordingly, the range of the gray scale level can be changed from 0~255 to 0~63, and the hardware resources can be saved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In a display system, an inputted video sequence comprising N image frames to be displayed which each consists of T pixels, each pixel of each image frame comprising M color components and M gray scale levels which each corresponds to one of the M color components, N, T, and M being a natural number, respectively, an apparatus functioning adjusting the M gray scale levels of the M color components of the jth pixel of the ith image frame in the video sequence, i being an integer index ranging from 1 to N, and j being an integer index ranging from 1 to T, the gray scale levels of the image frames previous to the ith image frame having been adjusted, each of the image frames previous to the ith image frame having a maximum gray scale level and a minimum gray scale level, each maximum gray scale level and the minimum gray scale level of said one image frame being determined based on the gray scale level thereof and being within an allowable range, said apparatus comprising:

a first calculating module, for calculating, according to the gray scale levels of the ith image frame, a current maximum gray scale level and a current minimum gray scale level;

a second calculating module, for calculating, according to all the maximum gray scale levels of the image frames previous to the ith image frame and the current maximum gray scale level, an average maximum gray scale level, and calculating, according to all the minimum gray scale levels of the image frames previous to the ith image frame and the current minimum gray scale level, an average minimum gray scale level;

a third calculating module, for calculating, according to the average maximum gray scale level, a first gain, and calculating, according to the average minimum gray scale level, a second gain;

a first judging module, for judging whether the jth pixel of the ith image frame is black;

a fourth calculating module, for adjusting, according to the second gain, the gray scale level of each color component of the jth pixel, when the jth pixel is black;

a second judging module, for judging whether the ith image frame is dark or light, when the jth pixel is not black;

a first processing module, for selectively adjusting, according to the first gain, the gray scale level of each color component of the jth pixel, when the jth pixel is not black, and the ith image frame is dark; and a second processing module, for selectively adjusting, according to the second gain, the gray scale level of each color component of the jth pixel, when the jth pixel is not black, and the ith image frame is light.

2. The apparatus of claim 1, further comprising a smooth processing module, for using a mask to smooth each pixel of each image frame.

3. The apparatus of claim 1, wherein the first gain g1 is calculated by the third calculating module via the following equation:

$$g1 = n * R\_max - Avg\_max;$$

wherein n represents a gain parameter, R_max represents a maximum level of the range of gray scale level, and Avg_max represents the average maximum gray scale level.

4. The apparatus of claim 3, wherein the first processing module comprises:

a first judging unit, for judging whether the minimum gray scale level of each color component of the jth pixel is smaller than a first threshold; and a first calculating unit, for directly adjusting, according to the first gain, the gray scale level of each color component of the jth pixel, when the minimum gray scale level is smaller than the first threshold, or calculating the gray scale level of each color component of the jth pixel via the following equation: $[(1/4 - 1/32) * (S - 704) * (1020 - 11 * g1) + 704 * g1]/64$, wherein S represents the gray scale level of each color component of the jth pixel.

5. The apparatus of claim 3, wherein the second gain g2 is calculated by the third calculating module via the following equation:

$$g2 = R\_max - Avg\_min;$$

wherein Avg_min represents the average minimum gray scale level.

6. The apparatus of claim 5, wherein the second processing module comprises:

a second judging unit, for judging whether the minimum gray scale level of each color component of the jth pixel is smaller than a second threshold; and a second calculating unit, for directly adjusting, according to the second gain, the gray scale level of each color component of the jth pixel, when the minimum gray scale level is smaller than the second threshold, or calculating the gray scale level of each color component of the jth pixel via the following equation: $[(1/4 - 1/128) * (S - $ 800)*(1224−15*g2)+800*g2]/64, wherein S represents the gray scale level of each color component of the jth pixel.

7. The apparatus of claim 1, wherein the first judging module judges the jth pixel of the ith image frame is black, when the maximum gray scale value is smaller than a third threshold; on the contrary, the first judging module judges the jth pixel of the ith image frame is not black.

8. The apparatus of claim 1, wherein the second judging module judges the ith image frame is dark, when a predefined percentage of the maximum gray scale values of every pixel of the ith image frame is smaller than the current maximum gray scale level; on the contrary, the second judging module judges the ith image frames is light.

9. The apparatus of claim 1, wherein the M color components are R, G, and B (Red, Green, and Blue) color components respectively conforming to RGB color space.

10. In a display system, an inputted video sequence comprising N image frames to be displayed which each consists of T pixels, each pixel of each image frame comprising M color components and M gray scale levels which each corresponds to one of the M color components, N, T, and M being a natural number, respectively, a method functioning adjusting the M gray scale levels of the M color components of the jth pixel of the ith image frame in the video sequence, i being an integer index ranging from 1 to N, and j being an integer index ranging from 1 to T, the gray scale levels of the image frames previous to the ith image frame having been adjusted, each of the image frames previous to the ith image frame having a maximum gray scale level and a minimum gray scale level, each maximum gray scale level and the minimum gray scale level of said one image frame being determined based on the gray scale level thereof and being within an allowable range, said method comprising the following steps of:

(a) calculating a current maximum gray scale level and a current minimum gray scale level in accordance with the gray scale levels of the ith image frame;

(b) calculating an average maximum gray scale level, in accordance with all the maximum gray scale levels of the image frames previous to the ith image frame and the current maximum gray scale level, and an average minimum gray scale level, in accordance with all the minimum gray scale levels of the image frames previous to the ith image frame and the current minimum gray scale level;

(c) calculating a first gain according to the average maximum gray scale level, and calculating a second gain according to the average minimum gray scale level;

(d) judging whether the jth pixel of the ith image frame is black, if yes, proceeding step (d1), otherwise, proceeding step (d2);

(d1) adjusting the gray scale level of each color component of the jth pixel, in accordance with the second gain;

(d2) judging whether the ith image frame is dark or light, and if the ith image frame is dark, processing step (d21), and if the ith image frame is light, processing step (d22);

(d21) selectively adjusting the gray scale level of each color component of the jth pixel, in accordance with the first gain; and (d22) selectively adjusting the gray scale level of each color component of the jth pixel, in accordance with the second gain.

11. The method of claim 10, further comprising the following step of:

smoothing each pixel of each image frame by a mask, before step (a).

12. The method of claim 10, wherein the first gain g1 is calculated via the following equation:

$$g1 = n * R\_max - Avg\_max;$$

wherein n represents a gain parameter, R_max represents a maximum level of the range of gray scale level, and Avg_max represents the average maximum gray scale level.

13. The method of claim 12, wherein step (d21) further comprises the following steps of:

(d211) judging whether the minimum gray scale level of each color component of the jth pixel is smaller than a first threshold, and if yes, processing step (d212), and if not, processing step (d213);

(d212) adjusting the gray scale level of each color component of the jth pixel, in accordance with the first gain; and (d213) calculating the gray scale level of each color component of the jth pixel via the following equation: [(¼−1/32)*(S−704)*(1020−11*g1)+704*g1]/64, wherein S represents the gray scale level of each color component of the jth pixel.

14. The method of claim 12, wherein the second gain g2 is calculated via the following equation:

$$g2 = R\_max - Avg\_min;$$

wherein Avg_min represents the average minimum gray scale level.

15. The method of claim 14, wherein step (d22) further comprises the steps of:

(d221) judging whether the minimum gray scale level of each color component of the jth pixel is smaller than a second threshold, and if yes, processing step (d222), and if not, processing step (d223);

(d222) adjusting the gray scale level of each color component of the jth pixel, in accordance with the second gain; and (d223) calculating the gray scale level of each color component of the jth pixel via the following equation: [(¼−1/128)*(S−800)*(1224−15*g2)+800*g2]/64, wherein S represents the gray scale level of each color component of the jth pixel.

16. The method of claim 10, in step (d), when the maximum gray scale value of every color component of the jth pixel is smaller than a third threshold, the jth pixel of the ith image frame is judged to be black; on the contrary, the jth pixel of the ith image frame is judged to be not black.

17. The method of claim 10, in step (d2), when a predefined percentage of the maximum gray scale values of every pixel of the ith image frame is smaller than the current maximum gray scale level, the ith image frame is judged to be dark; on the contrary, the ith image frames is judged to be light.

18. The method of claim 10, wherein the M color components are R, G, and B (Red, Green, and Blue) color components respectively conforming to RGB color space.

* * * * *

UNITED STATES PATENT AND TRADEMARK OFFICE
CERTIFICATE OF CORRECTION

| | |
|---|---|
| PATENT NO. | : 7,646,512 B2 |
| APPLICATION NO. | : 11/595662 |
| DATED | : January 12, 2010 |
| INVENTOR(S) | : Hsieh et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Sixteenth Day of November, 2010

David J. Kappos
*Director of the United States Patent and Trademark Office*